MICROWAVE SWITCH

Filed Jan. 14 1965 2 Sheets-Sheet 1

*INVENTORS*
HYMAN PLUTCHOK
ROBERT D. HALL
BY [signature]
ATTORNEY

INVENTORS
HYMAN PLUTCHOK
ROBERT D. HALL
BY
John F. Lawler
ATTORNEY 3,245,014
MICROWAVE SWITCH
Hyman Plutchok and Robert D. Hall, Los Altos, Calif., assignors to Sylvania Electric Products Inc., a corporation of Delaware
Filed Jan. 14, 1965, Ser. No. 425,430
6 Claims. (Cl. 333—97)

This is a continuation-in-part of patent application Serial No. 291,841, filed July 1, 1963, now abandoned, and assigned to the assignee of this application.

This invention relates to microwave switches and more particularly to a semiconductor diode switch capable of rapid switching over a broad band of frequencies.

A microwave switch which uses a semiconductor diode electrically connected in series with a microwave transmission line is described in copending application Serial No. 233,788, now Patent No. 3,179,816, by Robert D. Hall and Ronald D. Stewart. This switch has high isolation, low insertion loss, and extremely fast switching action (less than four nanoseconds) over approximately twenty percent of octave bandwidth. Many applications require broadband microwave switches. Heretofore, broadband switches having the advantages of the aforementioned switch have not been available. This invention is directed towards the provision of such a switch.

In accordance with this invention, a radio frequency filter comprising a microwave diode is located in a radio frequency transmission line for reflecting or passing microwave energy propagating on the line, depending on the operating state of the diode. In a preferred embodiment of the invention the radio frequency filter, referred to hereinafter as a filter-reflector, is essentially a T-section inductive input low-pass filter electrically connected in a coaxial transmission line. The center conductor of the coaxial line is modified to provide inductive components of the filter-reflector. A microwave semiconductor diode, having first and second operating states, is electrically connected in shunt between the inner and outer conductors. When the diode is reverse biased and nonconducting it provides the capacitive element of the filter-reflector for passing microwave energy propagating on the line and having a frequency in the passband of the filter-reflector. When the diode is forward biased and conducting it essentially short circuits the inner and outer conductors and reflects all microwave energy propagating on the line. The operating state of the diode, and thus of the filter-reflector, is controlled by a switching signal applied thereto from a bias-control circuit. The operating frequency of the filter-reflector may be extended by resonating the whisker inductance of the diode with a capacitive element of the bias circuit.

An object of this invention is the provision of a microwave switch having high isolation and low insertion loss and capable of rapid switching from its "off" state to its "on" state over a broad bandwidth.

A specific object is the provision of a semi-conductor switch capable of rapid switching over greater than seventy percent of octave bandwidth.

This invention and these and other of its objects will be more fully understood from the following description of a preferred embodiment thereof, reference being had to the accompanying drawings in which:

FIGURE 2 illustrates the circuit equivalents of a semiconductor diode, wherein

Figure 2:
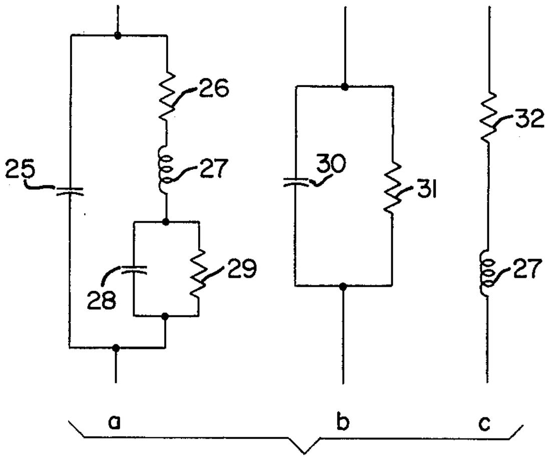

FIGURES 2*a* and 2*b* are circuit equivalents of a reverse biased diode, and

Figure 3:
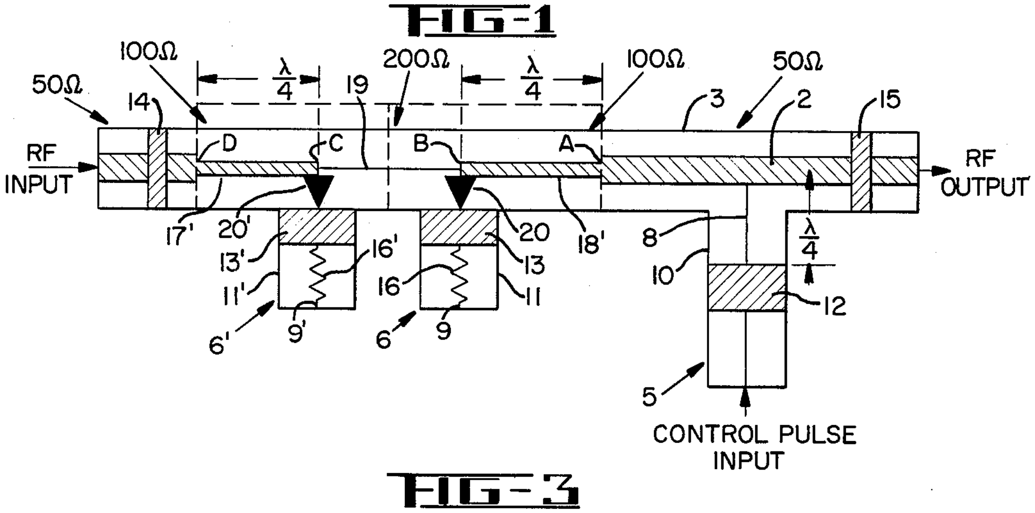
Figure 4:
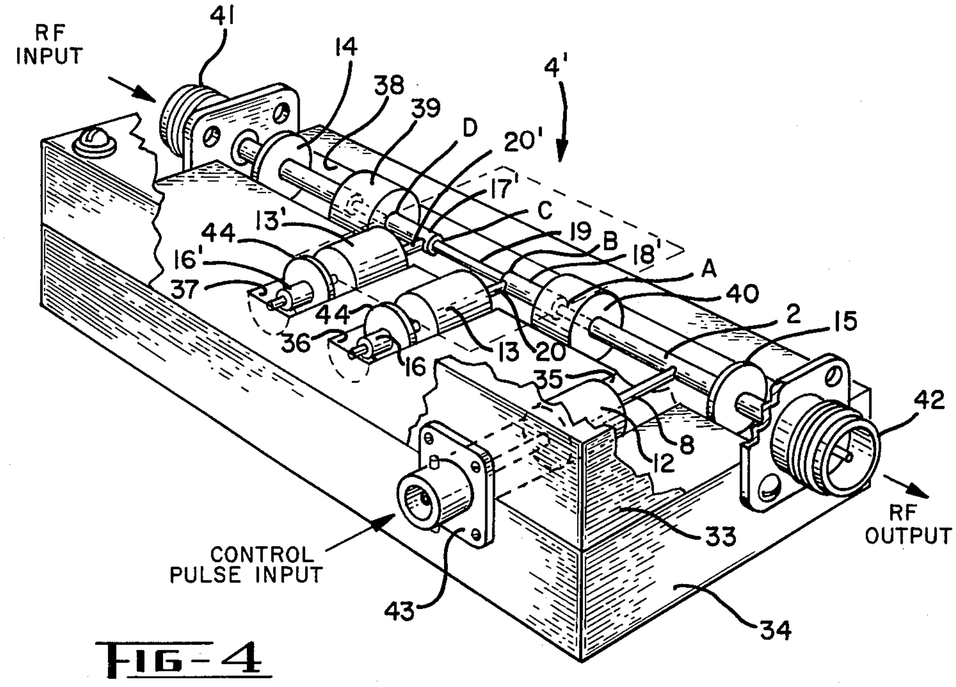
Figure 5:
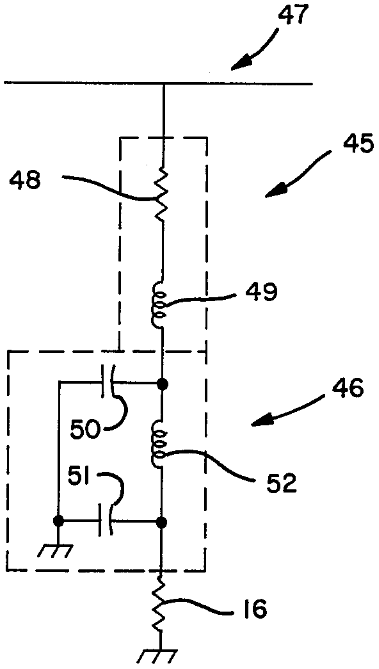

FIGURE 2*c* is the circuit equivalent of a forward biased diode;

FIGURE 3 is a schematic and block diagram of a modified form of the invention employing a two-section filter-reflector;

FIGURE 4 is a perspective view of the diode-filter-switch shown in FIGURE 3, with the top plate broken away to show the interior construction; and FIGURE 5 is the circuit equivalent of a diode and an output bias control line.

Figure 1:
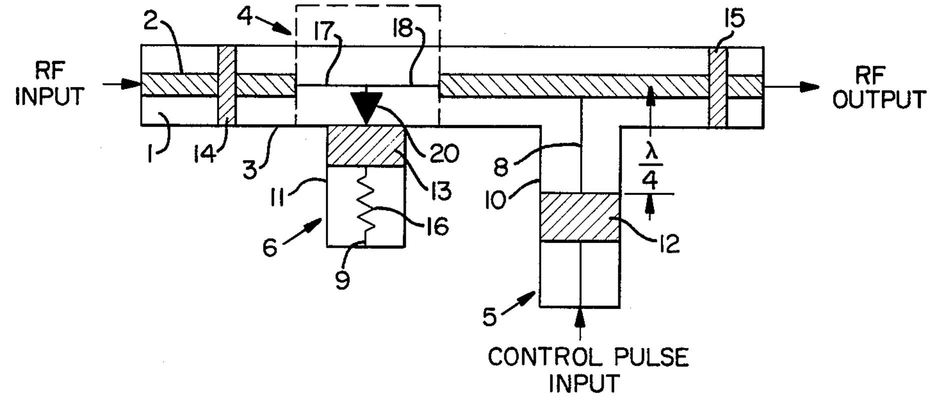
FIGURE 1 is a block diagram of a microwave diode-filter-switch in a coaxial transmission line.

Referring to the drawings, FIGURE 1 illustrates a preferred embodiment of the invention comprising a coaxial transmission line 1 having an inner conductor 2 and an outer conductor 3, a filter-reflector indicated at 4, and a bias-control circuit having input and output control lines 5 and 6. Control lines 5 and 6 are coaxial lines having inner conductors 8 and 9 and outer conductors 10 and 11, respectively. Radio frequency signals to be controlled are transmitted on coaxial line 1 from left to right as viewed. Control lines 5 and 6 contain low-pass filters 12 and 13, respectively. Coaxial line 1 contains high-pass filters 14 and 15. Control output line 6 is terminated in a matched termination 16.

Low-pass filters 12 and 13 are capacitive input pi-section filters having very low input impedance, such as filter 46 illustrated in FIGURE 5. Filters 12 through 15, inclusive, may be of the types described in Patent 3,167,729, on "Microwave Filter Insertable Within Outer Wall of Coaxial Line," by Robert D. Hall, and assigned to the assignee of this application.

The input capacitor of filter 13 is located at the junction of output control line 6 and outer conductor 3 of coaxial line 1. Conversely, the input capacitor of filter 12 is located a quarter wavelength from center conductor 2 of coaxial line 1 to reflect a very high impedance, which is effectively an open circuit between inner conductor 2 and outer conductor 3, at the junction of control line 5 and coaxial line 1.

Filter-reflector 4 comprises inductive elements 17 and 18, electrically connected in series with center conductor 2, and a microwave semiconductor diode 20 electrically connected between center conductor 2 and outer conductor 3. In practice, the diameters of predetermined lengths of coaxial line 1 may be modified and may be located in a dielectric spacer in order to provide the proper value of inductances for elements 17 and 18. Microwave diode 20 is electrically connected between center conductor 2 and outer conductor 3, through inductors 17 and 18 and through filter 13, matched termination 16, and outer conductor 11 of output control line 6, respectively.

A bias potential, applied through input control line 5, maintains diode 20, and thus filter-reflector 4, in one of its operating states. A control pulse superimposed on the bias potential and having a rise time less than the desired switching time of the diode-filter-switch, controls the operation of the diode and filter-reflector. When diode 20 is reverse biased it is essentially a capacitor and filter-reflector 4 is an inductive input T-section low-pass filter for passing incident signals on coaxial line 1 and frequency components comprising the control pulse. When the diode is forward biased it is essentially a short circuit between inner conductor 2 and outer conductor 3 (through the input capacitor of filter 13; see FIGURE 5, capacitor 50) for reflecting incident signals on coaxial line 1.

Assume for illustrative purposes that diode 20 is reverse biased. A control pulse applied to input control line 5 causes the potential developed across the diode to rise until the diode is forward biased. The diode then conducts through low-pass filter 12 and input control line 5, through coaxial line 1 and the diode, and through low-pass filter 13 and matched load 16 where the pulse is dissipated. The frequency components comprising the control pulse are different from and are spaced from the incident signals to be switched. Low-pass filters 12 and 13 are designed to pass, without reflection, control pulses having rise times in the order of the switching time to be achieved and to block from the control line the incident signals to be switched. Conversely, high-pass filters 14 and 15 are designed to pass the incident signal on coaxial line 1, and block the frequency components comprising the control pulse from the input and output sections of coaxial line 1.

There are five basic limitations on the time required to switch a diode switch from one state to the other: (1) the rise time of the control pulse; (2) the switching time of the diode element; (3) the bandwidth of the control line; (4) the bandwidth of the filter-reflector; and (5) the voltage standing wave ratio or match of the control lines when the diode is forward biased to block incident radio frequency signals. The rise time of the control pulse necessarily must be less than the switching time of the switch. The switching time of the diode element should be less than the rise time of the control pulse. The bandwidth of the control lines should be sufficiently broad to pass all frequency components comprising a control pulse having a particular rise time. The bandwidth of the filter-reflector should be sufficiently broad to pass the frequency components of the control pulse without reflection. Finally, the control lines should have a low standing wave ratio; i.e., a good match should be obtained between the diode, the output control line, and the conduction path of the control pulse.

The first two limitations are determined by availability of components to satisfy them. Assuming a control pulse with the requisite rise time and a diode capable of switching conduction states in the order of a nanosecond or less, the other limitations remain to be satisfied. The bandwidth of the control lines should be sufficiently broad to pass all the frequency components between D.C. and the upper frequency component determined by the rise time of the control pulse. The upper frequency $f$ that should be passed to reproduce a control pulse having a rise time $t$ is $$f \approx \frac{0.35}{t} \text{ to } \frac{0.45}{t}$$

see "Automatic Feedback Control Systems," by J. G. Truxall, page 80 (McGraw-Hill Book Company, Inc., 1955). The time required for the pulse amplitude to increase to the actuating level; i.e., the pulse rise time, increases if frequency components comprising the control pulse are not passed through the control circuit. The control lines and components employed herein are designed to pass the frequency components comprising the control pulse with substantially no reflections.

Finally, the voltage standing wave ratio on input and output control lines 5 and 6 and coaxial transmission line 1 should be low and the lines matched to the diode to insure that all frequency components comprising a control pulse having a particular rise time are passed through the control circuit without reflection when the diode is biased to switch conduction states. Since full switching of the diode does not occur until reflections have subsided, the finite interval of time required for reflections to subside lengthens the time required for the control pulse to reach its peak triggering amplitude. Such reflections are prevented in the circuit of FIGURE 1 through proper termination of the output control line 6 in a load 16 for matching the control pulse to the control line. Other components in the control lines are likewise designed to provide such a match. High-pass filters 14 and 15 present an open circuit to frequency components of the control pulse.

The circuit equivalents of a typical semiconductor diode 20 are shown in FIGURES 2*a*, *b*, and *c*. When diode 20 is reverse biased, FIGURES 2*a* and *b*, so that line 1 passes an incident signal, the diode is essentially a cartridge capacitance 25 in shunt with the series combination of a very low resistance 26, a small whisker inductance 27 and the parallel combination of a depletion layer capacitance 28 and large junction resistance 29. Cartridge capacitance is very small and for practical purposes may be neglected. Similarly, resistance 26 is very small and may be neglected. The resultant circuit equivalent of a reverse biased diode, shown in FIGURE 2*b*, is essentially a net reactance, represented by capacitor 30, shunted by a very large resistance 31. Thus the reverse biased diode provides the capacitive element of filter-reflector 4 and enables coaxial line 1 to pass incident signals.

The equivalent circuit of forward biased diode 20, illustrated in FIGURE 2*c*, comprises a low resistance 32 in series with a small whisker inductance 27. The semiconductor diode 20 is selected so that the retactance of inductance 27 is very low for the incident signals in order to provide essentially a short circuit between inner conductor 2 and outer conductor 3 of coaxial line 1 (through the input capacitor of filter 13; see FIGURE 5, capacitor 50) so that incident signals are reflected.

A modified form of the invention, which provides a switch having a broader bandwith, greater isolation in the "stop" or "reflection" state, and negligible increase in insertion loss in the "pass" state, is shown in FIGURE 3, and differs from the embodiment of FIGURE 1 in having a two-section filter-reflector 4′. Filter-reflector 4′ comprises inductive elements 17′, 18′, and 19 and diodes 20 and 20′. The inductive elements are preferably coaxial line sections electrically connected in series with coaxial line 1. Diodes 20 and 20′ are electrically connected between center conductor 2 and outer conductor 3 of coaxial line 1. More specifically, diodes 20 and 20′ are connected to the junctions of coaxial line sections 18′ and 19, and 17′ and 19 at B and C, respectively, and to outer conductor 3 of coaxial line 1 through low-pass filter 13 and termination 16 and low-pass filter 13′ and termination 16′, of output control lines 6 and 6′, respectively. The outer conductors of the control lines are electrically connected to the outer conductor of coaxial line 1.

The following description and computations related to the diode filter switch of FIGURE 3, which is assumed to operate in the frequency range of 1.5 to 2.5 gc., are made for illustrative purposes. Applicants' invention is not to be construed as limited thereto. For example, by employing a microwave semiconductor diode D4983, manufactured by Sylvania Electric Products Inc., and determining the component values in the manner described hereinafter, the operating frequency range of the switch may be extended to approximately 4.0 gc.

The inductances of coaxial inductive elements 17′, 18′, and 19 are preferably determined at a frequency hereinafter designated $f_{mid}$, approximately halfway between the midband and upper frequency over which the filter-switch is to operate. This is done in order to maintain a better match, over a broad band of frequencies, between filter-reflector 4′ and the input and output sections of coaxial line 1. The frequency $f_{mid}$ is approximately 2.25 gc. for a switch operating between 1.5 gc. and 2.5 gc. Each of the inductive elements 17′ and 18′ measures a quarter of a wavelength at $f_{mid}$ and each has a 100 ohm characteristic impedance. Coaxial line 1 has a 50 ohm characteristic impedance. Inductive element 19 preferably has a 200 ohm characteristic impedance and has an electrical length as determined and described hereinafter.

A quarter wavelength section of transmission line is also an impedance inverter. Therefore, inductive elements 17′ and 18′, in addition to providing the inductances for filter-reflector 4′, transform impedances in accordance with the relationship $$Z_1 Z_2 = Z_0^2 \quad (1)$$

where $Z_1$ is the impedance at each of points B and D, $Z_2$ is the impedance at each of points A and C, and $Z_0$ is the impedance of each of the quarter wavelength sections 17′ and 18′. The impedance at points B and D and A and C, respectively, are not necessarily equal. More specifically, the 50 ohm characteristic impedance $Z_2$ of the coaxial line connected to inductive element 18′ at point A, is transformed according to the above relationship to the impedance $Z_1$ at the point B by the quarter wavelength section 18′ which has a characteristic impedance $Z_0$. Thus, the transformed impedance at point B, called $Z_B$, equals 200 ohms when $Z_1=Z_B=200$ ohms, $Z_2=50$ ohms, and $Z_0=100$ ohms. The net retactance of diode 20, for example type FD-600 made by Fairchild Semiconductor, a division of Fairchild Camera and Instrument Corporation, is approximately $-j100$ at a frequency of 2.25 gc. The net admittance $Y_{Bn}$ at point B, normalized to the transformed line impedance $Z_B$ at point B, is $$Y_{Bn}=\frac{200}{200}-j\frac{200}{100} \quad (2)$$

$$Y_{Bn}=1+j2 \quad (3)$$

The reactance of diode 20′ is approximately $-j100$ ohms at point C, the connection of output control line 6′ to coaxial line 1. In order to compensate for the reactance of diode 20′ and to obtain a match of coaxial line 1 and inductive element 19 ($Z_{0(19)}=200$ ohms) by means of inductive element 17′ ($Z_{0(17')}=100$ ohms), the electrical length of inductive element 19 is determined, such as by a Smith chart, to be that length required to reflect to point C the conjugate of the net admittance at point B. More particularly, coaxial line inductive element 19 transforms the normalized admittance $Y_{Bn}$, represented by Equation 3, to its conjugate at point C as defined by the expression $$Y_{Cn}=1-j2 \quad (4)$$

The admittance $Y_{Cn}$, according to Equation 4, combines with the susceptance of diode-capacitor 20′ such that the net impedance at point C is $Z_C=200$ ohms, and filter-reflector 4′ is matched to the radio frequency input section of coaxial line 1.

Inductive element 17′ transforms the net impedance $Z_C=200$ ohms, according to Equation 1, to the net impedance $Z_D=50$ ohms, at point D. Thus, the filter-reflector 4′ is matched to coaxial line 1 to provide minimum reflection and insertion loss when the filter-switch is operating in the "pass" state.

An embodiment of the circuit of FIGURE 3 is shown in FIGURE 4. The assembly consists of substantially identical plates 33 and 34, each having semi-cylindrical parallel grooves 35, 36, and 37 which intersect a fourth semi-cylindrical groove 38 at right angles. The semi-cylindrical surfaces defining grooves 35, 36, and 37 correspond to the outer conductors of control lines 5, 6, and 6′, respectively. The semi-cylindrical surface defining groove 38 corresponds to the outer conductor 3 of coaxial line 1. Rods disposed within these grooves comprise the center conductors of the coaxial lines and the inductors 17′, 18′, and 19. High-pass filters 14 and 15, low-pass filters 12, 13, and 13′, and diodes 20 and 20′ are connected in series with the respective center conductors as shown. Spacers 39, 40, 44 and 44′ and the disc filters locate the center conductors and diode symmetrically within the grooves. Standard coaxial connectors 41, 42, and 43 provide connections for the filter-switch to external circuitry.

A principal factor limiting the isolation and bandwidth of a diode switch is the diode whisker inductance 27, see FIGURE 2*a*. Since inductive reactance is directly proportional to frequency, there is some frequency above which it is no longer negligible. One means of compensating for this characteristic is by reducing its value at higher frequencies as explained in conjunction with FIGURE 5.

The circuit of FIGURE 5 comprises a coaxial line 47, comparable to coaxial line 1, connected to a control line, similar to control lines 6 and 6′, having a diode 45 and a low-pass filter 46 that is similar to low-pass filters 12, 13, and 13′. Forward biased diode 45 comprises a small resistance 48 and whisker inductance 49. Filter 46 comprises capacitors 50 and 51 and inductor 52.

The reactance of the whisker inductance 49 is compensated by resonating it with capacitor 50 of filter 46 at a frequency near the low end of the frequency band over which the switch is to operate. The isolation for frequencies below the low end of the band is decreased while the isolation for frequencies within the frequency band of interest is increased.

By way of example, diode-filter-switches employing two diodes and having greater than 50 db isolation and less than 2 db insertion loss over approximately seventy percent of octave bandwidth, from 1.3 gc. to 2.2 gc., and having a switching time of less than 2 nanoseconds, have been successfully operated. Similarly, diode-filter-switches employing three diodes and having greater than 60 db isolation and less than 2 db insertion loss over octave bandwidth from 1.2 gc. to 2.4 gc. and a switching time of less than 2 nanoseconds, have been successfully operated.

Variations and modifications of this invention will be apparent to those skilled in the art, for example, other types of inductive impedance transformers may be substituted for the coaxial line quarter wavelength inductive elements described herein. Therefore, the scope of this invention is defined by the appended claims.

What is claimed is:

1. A microwave switch comprising
a coaxial transmission line having an input end and an output end and comprising
an inner conductor and an outer conductor,
high-pass coaxial filters connected to said coaxial line adjacent to the input and output ends, respectively,
said filters having a predetermined cutoff frequency less than the frequency of microwave signals to be switched,
a low-pass filter,
a microwave diode having a pair of terminals,
one of said terminals being directly electrically connected to said inner conductor,
the other terminal of said diode being electrically connected through said low-pass filter to said outer conductor of the coaxial line,
bias control means for changing said diode between a conducting state and a nonconducting state comprising
a coaxial control line having inner and outer conductors connected to said inner and outer conductors, respectively, of the transmission line,
a low-pass microwave filter connected to said control line, and
means for applying a control pulse to said control line,
first inductance means electrically connected in series with the inner conductor of said transmission line between said high-pass filter at said input end and said connection of the diode to the inner conductor, and
second inductance means electrically connected in series with the inner conductor of said transmission line between the connections thereto of said control line and said diode,
said first and second inductance means having predetermined values of inductance and forming a T-section low-pass filter with said diode when the latter is in the nonconducting state,
said diode in the conducting state electrically shorting the transmission line and blocking transmission of microwave signals.

2. A microwave switch comprising
a coaxial transmission line comprising
an inner conductor and an outer conductor,
high-pass coaxial filters connected to said coaxial line at longitudinally spaced locations, said filters having a predetermined cutoff frequency less than the frequency of microwave signals to be switched, a microwave diode electrically connected to said inner and outer conductors, bias control means for changing said diode between a conducting state and a nonconducting state comprising a coaxial control line having inner and outer conductors connected to said inner and outer conductors, respectively, of the transmission line between one of said high-pass filters and said diode, means for applying a control pulse to said control line, and frequency selective means electrically connected in said coaxial control line for passing to said diode frequency components comprising the control pulse and for blocking from said control line frequency components comprising the incident signal on said coaxial transmission line, first inductance means electrically connected in series with the inner conductor of said transmission line between the other of said high-pass filters and said connection of the diode to the inner conductor, and second inductance means electrically connected in series with the inner conductor of said transmission line between the connections thereto of said control line and said diode, said first and second inductance means having predetermined values of inductance and forming a T-section low-pass filter with said diode when the latter is in the nonconducting state, said diode in the conducting state electrically shorting the transmission line and blocking transmission of microwave signals.

3. The switch according to claim 2 in which said first and second inductance means each comprises a predetermined length of a coaxial conductor having a transverse dimension different from the transverse dimension of the inner conductor of the transmission line.

4. A broadband radio frequency switch comprising a coaxial transmission line adapted to transmit radio frequency signals to be controlled and having an inner and outer conductor, first and second substantially identical radio frequency filters electrically connected to said line and spaced apart in the direction of signal transmission, a radio frequency diode-filter electrically connected in series with said inner conductor and in shunt between said inner and outer conductors, said filter comprising first, second and third inductance elements electrically connected in series with said inner conductor, a first semiconductor diode electrically connected to said outer conductor and to the inner conductor at the connection of said first and second elements, a second semiconductor diode electrically connected to said outer conductor and to the inner conductor at the connection of said second and third elements, said diodes having first and second operating states whereby the diodes exhibit capacitive and short circuit characteristics, respectively, between said inner and outer conductors for passing and blocking incident signals applied to the transmission line, a control circuit for actuating said diodes to change from one operating state to the other comprising an input line electrically connected to said transmission line between said third element and one of said first pair of filters, a third filter electrically connected in series with said input line, and bias and control voltage means electrically connected to said input line opposite from the transmission line and adapted to control the operating states of said diodes.

5. The switch according to claim 4 in which said first, second and third inductance elements each comprises a predetermined length of a coaxial conductor having a transverse dimension different from the transverse dimension of the inner conductors of the transmission line.

6. A broadband radio frequency switch comprising a coaxial transmission line adapted to transmit radio frequency signals to be controlled and having an inner and outer conductor, filter means in said transmission line, a radio frequency diode-filter electrically connected in series with said inner conductor and in shunt between said inner and outer conductors, said filter comprising a plurality of inductance elements electrically connected in series with said inner conductor, and semiconductor diode means electrically connected to said outer conductor and to said inductance elements, said diode means having first and second operating states whereby to exhibit capacitive and short circuit characteristics, respectively, for passing and blocking incident signals applied to the transmission line, and a control circuit for actuating said diode means to change from one operating state to the other.

References Cited by the Examiner

UNITED STATES PATENTS

| | | | |
|---|---|---|---|
| 2,512,673 | 6/1950 | Page | 333—13 |
| 3,117,241 | 1/1964 | Paynter | 307—88.5 |
| 3,131,365 | 4/1964 | Hoover | 333—97 |
| 3,167,729 | 1/1965 | Hall | 333—73 |
| 3,179,816 | 4/1965 | Hall | 333—7 |

HERMAN KARL SAALBACH, *Primary Examiner.*